(12) United States Patent
Malik et al.

(10) Patent No.: US 6,621,718 B1
(45) Date of Patent: Sep. 16, 2003

(54) RESONANT CONVERTER CIRCUIT

(75) Inventors: Randhir S. Malik, Cary, NC (US); William Hemena, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/721,244

(22) Filed: Nov. 22, 2000

(51) Int. Cl.[7] .............................................. H02M 3/335
(52) U.S. Cl. ............................ 363/26; 363/127; 363/89
(58) Field of Search ............................. 363/16, 17, 25, 363/26, 89, 127, 131, 18, 19, 21.02, 15

(56) References Cited

U.S. PATENT DOCUMENTS

| | | | |
|---|---|---|---|
| 4,685,041 A | | 8/1987 | Bowman et al. |
| 5,063,332 A | * | 11/1991 | El-Hamamsy et al. ...... 315/284 |
| 5,140,510 A | | 8/1992 | Myers |
| 5,140,513 A | | 8/1992 | Yokoyama |
| 5,386,359 A | | 1/1995 | Nochi |
| 5,521,807 A | * | 5/1996 | Chen et al. .................... 323/97 |
| 5,640,082 A | | 6/1997 | Lusher et al. |
| 5,684,678 A | * | 11/1997 | Barrett .......................... 363/17 |
| 5,702,431 A | * | 12/1997 | Wang et al. ................... 607/33 |
| 5,959,856 A | * | 9/1999 | Sturgeon ..................... 363/132 |
| 6,101,102 A | * | 8/2000 | Brand et al. ................... 363/15 |
| 6,151,222 A | * | 11/2000 | Barrett .......................... 363/16 |
| 6,301,128 B1 | * | 10/2001 | Jang et al. ..................... 363/17 |

FOREIGN PATENT DOCUMENTS

| | | |
|---|---|---|
| EP | 0788217 | 8/1997 |
| JP | 5344722 | 12/1993 |

* cited by examiner

*Primary Examiner*—Michael Sherry
*Assistant Examiner*—Gary L. Laxton
(74) *Attorney, Agent, or Firm*—Sawyer Law Group

(57) ABSTRACT

A power converter circuit is disclosed. The power converter circuit comprises an oscillator for receiving an input wherein the oscillator operates with a fixed frequency and a resonant circuit coupled to the oscillator, wherein the resonant circuit is adjusted to minimize switching losses. Through the use the power converter circuit in accordance with the present invention, high switching losses are avoided thereby resulting in an increase in the overall efficiency of the power converter circuit.

9 Claims, 4 Drawing Sheets

RESONANT CONVERTER CIRCUIT

FIELD OF THE INVENTION

The present invention relates generally to power supply systems and particularly to a power converter circuit.

BACKGROUND OF THE INVENTION

A typical switching-type power converter circuit operates by storing and releasing energy in various discrete capacitive and inductive components during each cycle of operation, where the time interval for each cycle is determined by the switching frequency. An increase in switching frequency reduces the storage time interval and the level of energy stored in reactive components during any one particular cycle of operation. In principle this increase in frequency permits reduction of both the physical and electrical sizes of magnetic and capacitive storage elements for any particular power capacity.

Please refer now to FIG. 1(a). FIG. 1(a) is a high level illustration of a conventional switching-type power converter circuit 10. The circuit 10 includes an input 11, a variable frequency voltage control oscillator 14, a fixed frequency resonant circuit 15, filter components 25, an error amplifier 36, and an output 38. The voltage control oscillator 14 is coupled to the resonant circuit 15 and the error amplifier 36 wherein the error amplifier 36 is coupled to the output 38. The resonant circuit 15 is coupled to the filter components 25 wherein the filter components 25 are coupled to the output 38.

For a more detailed description of the conventional switching-type power converter circuit 10, please refer now to the FIG. 1(b). Shown in the figure are the input 11, first, second, third and fourth capacitors 12, 18, 28, 34, the voltage control oscillator 14, two switches 16, 20, first and second inductors 22, 32, a transformer 24, two diodes 26, 30, an error amplifier 36, and an output 38.

The input 11 is coupled to the first capacitor 12 and the first switch 16 wherein the first switch 16 is coupled to the voltage control oscillator 14 and the second switch 20. The voltage control oscillator 14 is also coupled to the second switch 20 and the first capacitor 12 is coupled to the transformer 24. The first and second switches 16, 20 are coupled to the second capacitor 18 wherein the second capacitor 18 is coupled to the first inductor 22. The first inductor 22 is coupled to the transformer 24 wherein the transformer 24 is coupled to the third capacitor 28. The third capacitor 28 is coupled to the first and second diodes 26, 30 wherein the first and second diodes 26, 30 are coupled to the second inductor 32. The second inductor 32 is coupled to the fourth capacitor 34 wherein the fourth capacitor 34 is coupled to the output 38. The output 38 is coupled to the error amplifier 36 wherein the error amplifier 36 is coupled to the voltage control oscillator 14.

The resonant circuit 15 comprises the first inductor 22, transformer 24 and the third capacitor 28. The filter components 25 comprise the two diodes 26, 30, the second inductor 32 and the fourth capacitor 34. The second capacitor 18 develops almost half of the DC input voltage and also prevents the transformer 24 from saturating. The first inductor 22 is a leakage inductor for the transformer 24 and the two diodes 26, 30 are used for rectifying a sine wave voltage that is developed across the third capacitor 28.

During operation, the circuit 10 operates over a wide range of load conditions wherein the output 38 of the power converter circuit 10 is a regulated output. The output 38 is regulated by allowing the error amplifier 36 to sense the output DC voltage. Because the output DC voltage has a tendency to change from its set voltage, the error amplifier 36 subsequently develops a voltage that will vary the frequency of voltage control oscillator 14. A square wave of different frequency applied across the fixed frequency resonant circuit 15 will increase or decrease the voltage developed across the fourth capacitor 34 thereby increase or decreasing the voltage at the output 38.

Because the switches 16, 20 each experience full voltage when being turned on, the circuit 10 can not operate in a zero voltage switching (ZVS) mode. Consequently, since the circuit can not operate in a ZVS mode, as the frequency increases, the switching losses incurred by the two switches 16, 20 increases. These losses become significant at frequencies of 5 megahertz or higher.

Accordingly, what is needed is an improved converter circuit. The circuit should be simple, cost effective, and easily adaptable to existing technology. The present invention addresses such a need.

SUMMARY OF THE INVENTION

A power converter circuit is disclosed. The power converter circuit comprises an oscillator for receiving an input wherein the oscillator operates with a fixed frequency and a resonant circuit coupled to the oscillator, wherein the resonant circuit is adjusted to minimize switching losses.

Through the use the power converter circuit in accordance with the present invention, high switching losses are avoided thereby resulting in an increase in the overall efficiency of the power converter circuit.

DETAILED DESCRIPTION

The present invention relates to a power converter circuit. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The present invention provides for a power converter circuit for a computer system wherein the power converter circuit includes a variable frequency resonant circuit. In accordance with the present invention, the capacitance of the resonant circuit is varied in order to provide a regulated output without changing the frequency of the voltage oscillator. By keeping the frequency of the voltage oscillator constant, high switching losses are avoided thereby resulting in an increase in the overall efficiency of the power converter circuit.

Figure 1A:
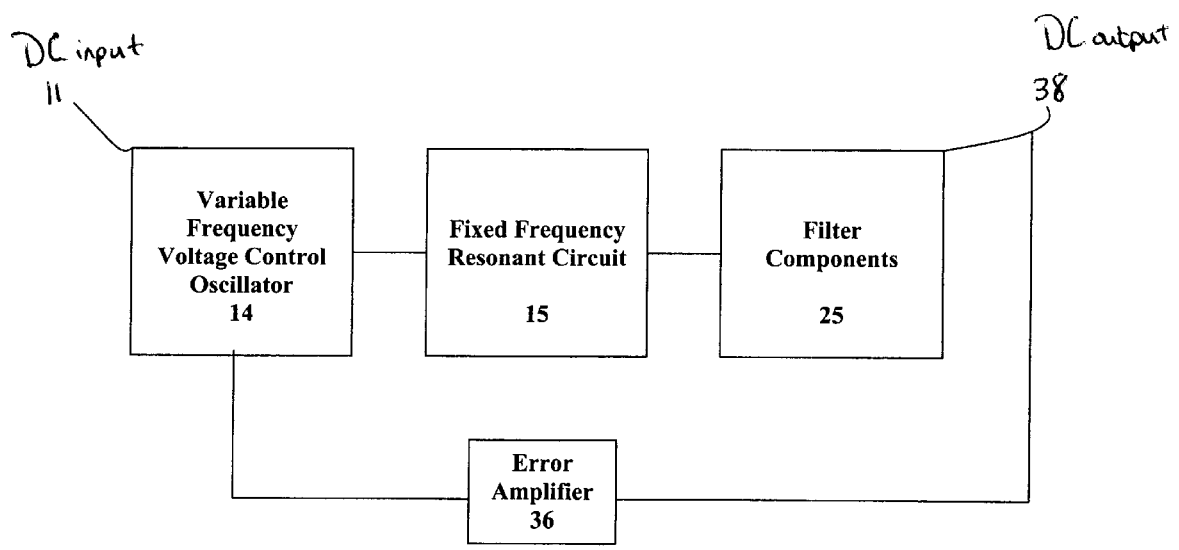
FIG. 1(a) is a high level illustration of a conventional switching-type power converter circuit.
Figure 1B:
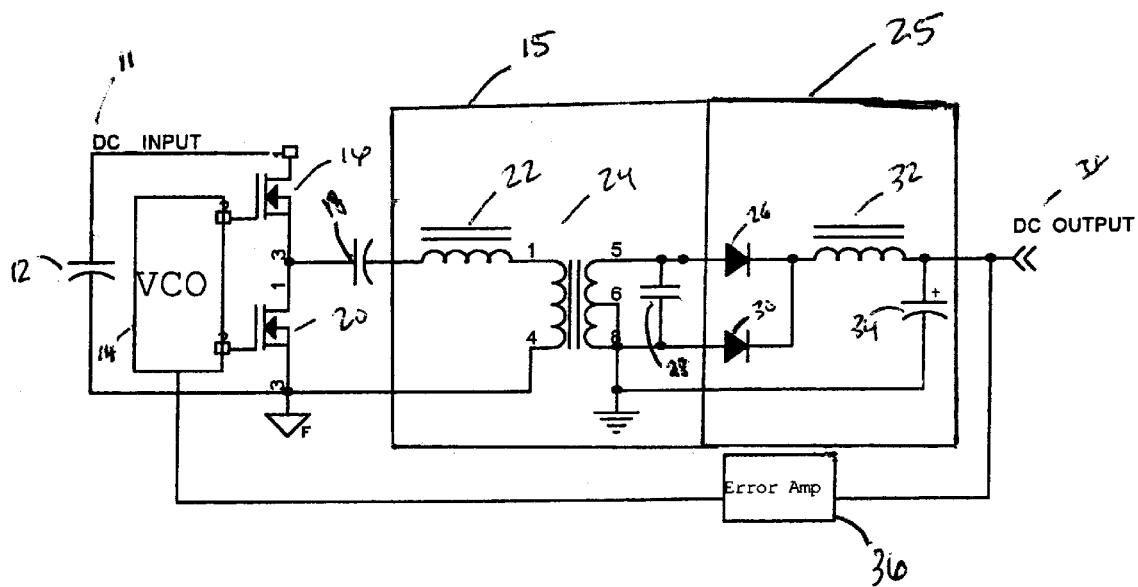
FIG. 1(b) is a more detailed description of the conventional switching-type power converter circuit of FIG. 1(a).
Figure 2A:
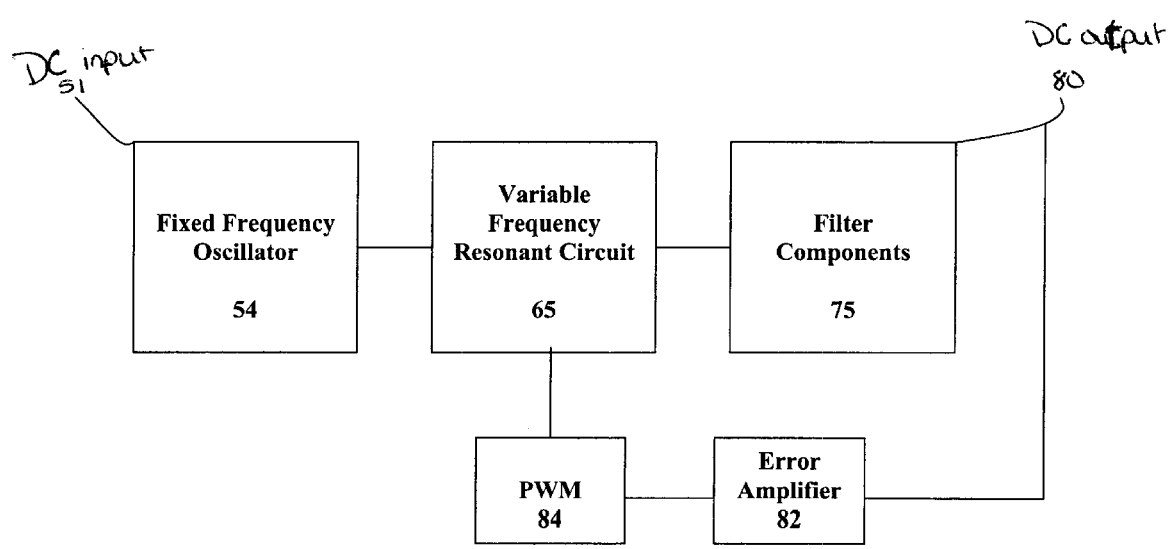
FIG. 2(a) is a high level illustration of a converter circuit in accordance with the present invention.

Please refer now to FIG. 2(a). FIG. 2(a) is a high level illustration of a power converter circuit 50 in accordance with the present invention. The circuit 50 includes an input 51, a fixed frequency oscillator 54, a variable frequency resonant circuit 65, filter components 75, an output 80, an error amplifier 82 and an pulse width modulator 84. The fixed frequency oscillator 54 is coupled to the variable frequency resonant circuit 65 and the variable frequency resonant circuit 65 is coupled to the filter components 75 and the pulse width modulator 84. The pulse width modulator 84 is coupled to the error amplifier 82 wherein the error amplifier 82 is coupled to the output 80.

Figure 2B:
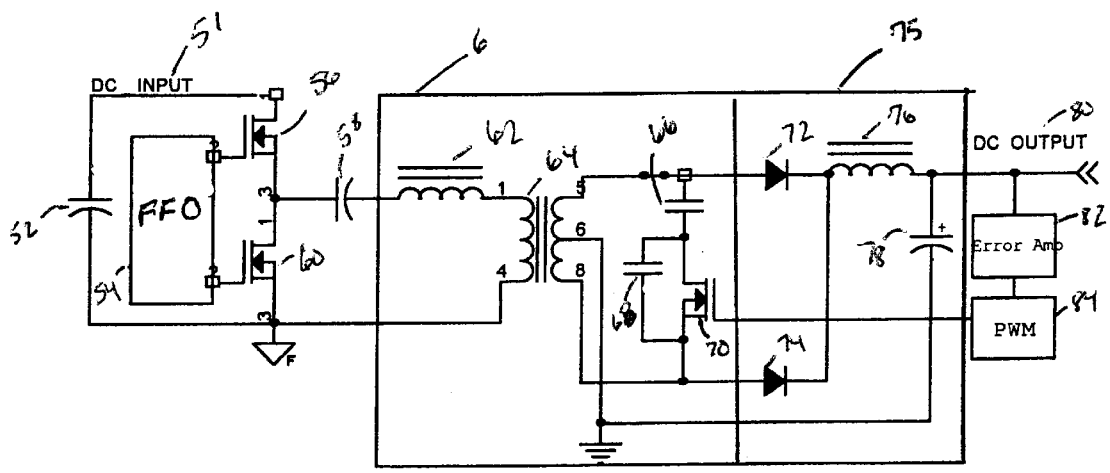
FIG. 2(b) is a more detailed description of the converter circuit in accordance with the present invention.

For a more detailed description of the power converter circuit 50 in accordance with the present invention, please refer now to the FIG. 2(b). Shown in the figure are the input 51, a first capacitor 52, the fixed frequency oscillator 54, first and second switches 56, 60, a second capacitor 58, the resonant circuit 65, and the filter components 75. The resonant circuit 65 comprises a first inductor 62, a transformer 64, third and fourth capacitors 66, 68 and a third switch 70. The filter components 75 comprises the two diodes 72, 74, a second inductor 76, and a fifth capacitor 78.

The input 51 is coupled to the first capacitor 52 and the first switch 56 wherein the first switch 56 is coupled to the fixed frequency oscillator 54 and the second switch 60. The fixed frequency oscillator 54 is also coupled to the second switch 60. The first and second switches 56, 60 are coupled to the second capacitor 58 wherein the second capacitor 58 is coupled to the first inductor 62. The first inductor 62 is coupled to the transformer 64 wherein the transformer 64 is coupled to the third capacitor 66 and the second diode 74. The third capacitor 66 is coupled to the fourth capacitor 68 and the third switch 70. The first and second diodes 72, 74 are coupled to the second inductor 76 wherein the second inductor 76 is coupled to the fifth capacitor 78 and the output 80. The output 80 is coupled to the error amplifier 82 wherein the error amplifier 82 is coupled to the pulse width modulator 84. The pulse width modulator 84 is coupled to the third switch 70.

By utilizing the circuit 50 in accordance with the present invention, the frequency of the oscillator 54 is kept constant while the capacitance of the resonant circuit is varied. Preferably, the fixed frequency oscillator 54 comprises a square wave oscillator. (The square wave produced by the square wave oscillator 54 becomes a sine wave when the square wave is applied to the resonant circuit.) The capacitance of the resonant circuit is varied by utilizing the pulse width modulator 84 to turn the third switch 70 on and off based on a duty ratio. What is meant by duty ratio is the amount of time that the switch 70 is "on" divided by the total cyclical period. Therefore, if the switch is on for 5 microseconds and off for 5 microseconds, the total period is 10 microseconds. Hence, a duty ratio of 5 divided by 10 or 1/2.

The duty ratio of the pulse width modulator 84 is determined by the output of the error amplifier 82. Consequently, the effective capacitance of the resonant circuit is:

$$C_{res} = \frac{C_3 \times D(C_4)}{C_3 + D(C_4)}$$

where $C_{res}$ is the total capacitance of the resonant circuit, $C_3$ is the capacitance of the third capacitor 66, D is the duty ratio of the third switch 70 and $C_4$ is the capacitance of the fourth capacitor 68. In addition, the switches 56, 60 operate at a 50% duty cycle. That is to say that when switch 56 is on, switch 60 is off and vice versa. Because the frequency of the oscillator 54 is fixed, each of the switches 56, 60 are able to be turned on at time when there is no voltage across it. Therefore, the circuit 50 in accordance with the present invention operates in a ZVS mode which results in a substantial reduction in switching losses due to hard turn ons.

Although the preferred embodiment of the present invention is described in the context of having a single output, one of ordinary skill in the art will readily recognize that the present invention can be utilized with multiple outputs while remaining within the spirit and scope of the present invention. This can be achieved, for example by coupling multiple resonant circuits to the fixed frequency oscillator.

In accordance with the present invention, by keeping constant the frequency of the oscillator and varying the capacitance of the resonant circuit based on the duty ratio of the pulse width modulator, the circuit is able to operate in a ZVS mode. Because the circuit operates in a ZVS mode, the high switching losses incurred through the use of conventional converter circuits are avoided. This results in an increase in circuit efficiency.

Although the present invention has been described in accordance with the embodiments shown, one of ordinary skill in the art will readily recognize that there could be variations to the embodiments and those variations would be within the spirit and scope of the present invention. For example, although the preferred embodiment of the present invention describes varying the capacitance of the resonant circuit, the inductance of the resonant circuit could be varied instead. Accordingly, many modifications may be made by one or ordinary skill in the art without departing from the spirit and scope of the appended claims.

What is claimed is:

1. A resonant converter circuit comprising:
   an oscillator for receiving an input wherein the oscillator operates with a fixed frequency;
   a resonant circuit coupled to the oscillator, the resonant circuit comprising a transformer, at least two capacitors in series coupled to a secondary winding of the transformer, and a switch coupled to one of the at least two capacitors; and
   a pulse width modulator coupled to the resonant circuit, wherein the pulse width modulator is utilized to vary a capacitance of the resonant circuit.

2. The resonant converter circuit of claim 1 wherein the circuit further comprises:
   an error amplifier coupled to the pulse width modulator for receiving an output.

3. The resonant converter circuit of claim 1 wherein the pulse width modulator turns the switch on and off at a variable rate.

4. The resonant converter circuit of claim 3 wherein the oscillator comprises a square wave oscillator.

5. The circuit of claim 4 wherein the square wave oscillator is coupled to two switches wherein the switches operate in a zero voltage switch mode.

6. A resonant converter circuit comprising:
   a square wave oscillator for receiving an input wherein the oscillator operates with a fixed frequency;
   a resonant circuit coupled to the square wave oscillator, the resonant circuit comprising:
   a transformer;
   at least two capacitors in series coupled to a secondary winding of the transformer; and
   a switch coupled to one of the at least two capacitors; and a pulse width modulator coupled to the switch wherein the pulse width modulator is utilized to vary a capacitance of the resonant circuit.

7. The resonant converter circuit of claim 6 further comprising an error amplifier coupled to the pulse width modulator for receiving an output.

8. The resonant converter circuit of claim 7 wherein the square wave oscillator is coupled to two switches wherein the switches operate in a zero voltage switch mode.

9. A power converter circuit comprising:

a square wave oscillator for receiving an input wherein the oscillator operates with a fixed frequency;

two switches coupled to the square wave oscillator wherein the two switches operate in a zero voltage switch mode;

a resonant circuit coupled to the square wave oscillator, the resonant circuit comprising:

an inductor;

a transformer coupled to the inductor;

at least two capacitors in series coupled to a secondary winding of the transformer; and a switch coupled to one of the at least two capacitors;

a pulse width modulator coupled to the resonant circuit via the switch wherein the pulse width modulator is utilized to vary a capacitance of the resonant circuit; and an error amplifier coupled to the pulse width modulator for receiving an output.

* * * * *